O. M. LEICH & C. E. HAGUE.
SYSTEM FOR MEASURING THE CAPACITY OF ELECTRICAL CONDUCTORS.
APPLICATION FILED JULY 16, 1907.

1,035,204.

Patented Aug. 13, 1912.

O. M. LEICH & C. E. HAGUE.
SYSTEM FOR MEASURING THE CAPACITY OF ELECTRICAL CONDUCTORS.
APPLICATION FILED JULY 16, 1907.

1,035,204.

Patented Aug. 13, 1912.

Witnesses
George C. Higham.
Leonard W. Novander.

Inventors
Oscar M. Leich
Charles E. Hague
By Brown William
Attorneys

UNITED STATES PATENT OFFICE.

OSCAR M. LEICH AND CHARLES E. HAGUE, OF ROCHESTER, NEW YORK, ASSIGNORS TO STROMBERG-CARLSON TELEPHONE MANUFACTURING COMPANY, OF ROCHESTER, NEW YORK, A CORPORATION OF NEW YORK.

SYSTEM FOR MEASURING THE CAPACITY OF ELECTRICAL CONDUCTORS.

1,035,204. Specification of Letters Patent. Patented Aug. 13, 1912.

Application filed July 16, 1907. Serial No. 384,091.

*To all whom it may concern:*

Be it known that we, OSCAR M. LEICH and CHARLES E. HAGUE, citizens of the United States, residing at Rochester, in the county of Monroe and State of New York, have invented a new and Improved System for Measuring the Capacity of Electrical Conductors, of which the following is a specification.

In measuring the capacity of electrical conductors, it has been the usual practice in the past to connect such conductors to a suitable charging source of electric energy for a certain time interval, to then disconnect such conductors from such charging source and immediately after such disconnection to connect such charged conductors to a suitable measuring instrument for indicating the quantity of electrification retained by such conductors. An instrument very commonly used for this purpose is a galvanometer used in combination with a variable shunt resistance about its terminals by which for any particular test, an adjustment can be made such that the relation between the throws for such conductors and a standard condenser when similarly charged, is an indication of the capacity of the conductors relatively to such condenser. In operating such a system as just indicated, it has been the usual practice to make use of a manually operated key for directly connecting such charging source of energy to the conductors to be tested, and to subsequently connect these conductors by means of the same key to the galvanometer for measuring the charge. Inasmuch as the quantity of electrification imparted to the conductors for any given potential of the charging source depends, below the fully charged condition, upon the length of time that such conductors are connected to such source, it is apparent that in systems of this character it is very desirable to provide means for accurately timing the intervals of charging so that when it is desirable to make several successive tests under the same conditions, as for instance in testing telephone cable, these time intervals shall be exactly alike. For economical considerations in operating such testing systems, it is also desirable that the discharge intervals through the galvanometer shall be of no longer duration than is necessary for accurately reading the deflections of such galvanometer. Since the charging is usually done by a battery of high potential, a comparatively short time interval is sufficient for the charging interval, while a comparatively long interval of discharge is required since the discharge is effected only by the electrification stored up in the associated conductors during the charging interval. In former systems of testing in which these intervals have been determined entirely by a manually operated key, the accuracy of the measurements has depended entirely upon the ability of the operator to establish the charging and discharging intervals successively in exactly the same manner.

It is an object of our invention to measure the capacity of conductors automatically, that is, to connect such conductors to a charging source of electric energy, to maintain such charging condition for a certain predetermined interval and then to interrupt such charging condition and immediately establish a discharging condition through a suitable measuring instrument, usually a galvanometer and associated adjustable shunt resistance about its terminals and to maintain this discharging condition for a certain predetermined interval and to then restore all of the apparatus to its normal condition. All of this we accomplish automatically, that is, by the single closure of a key and by our invention we establish intervals of charging and discharging which for any given adjustment of the apparatus, remain fixed for successive measurements and therefore all error due to differences in the lengths of these intervals is eliminated.

It is also an object of our invention to secure relatively longer intervals of discharge than charge, by effecting a much slower rate of deënergization than energization of the electro-magnetic mechanism involved in determining the length of such charging intervals by its energization and this slower deënergization we secure by closing a low resistance path or paths between the terminals of an energizing winding or windings of such electro-magnetic mechanism.

It is also an object of our invention to maintain the same intervals of charging and discharging for any arrangement of the apparatus independently of the length of time the key is held in its operative position, It is also an object of our invention to secure all of the above results with a minimum amount of apparatus involved.

The several drawings illustrating our invention are as follows:

Figure 1 is a diagrammatic view of all of the apparatus and circuit connections used in our system, while

Similar letters refer to similar parts throughout the several views.

Figure 1:
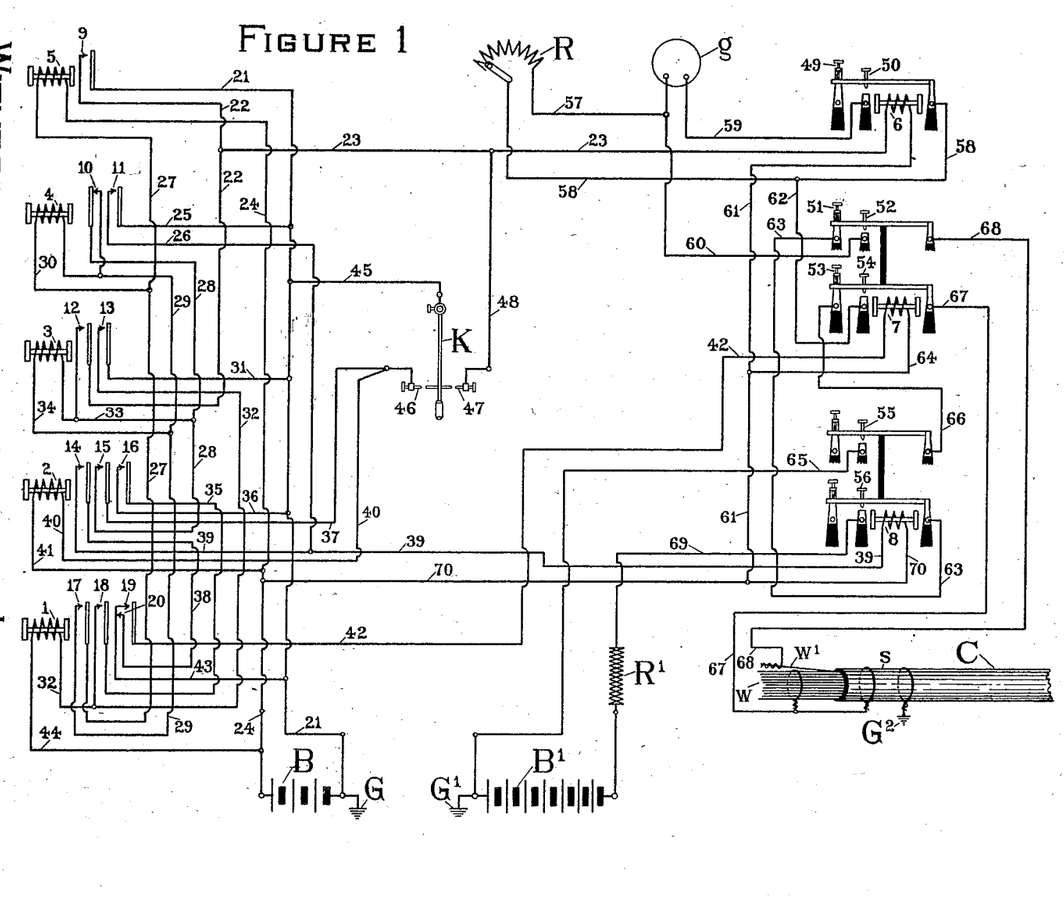

Referring to Fig. 1, the several relays 1, 2, 3, 4 and 5 are of ordinary telephonic construction and are connected so that they are suitably operated one from the other and that they also operate other relays 6, 7 and 8 at the proper time, these latter relays being especially designed to withstand high voltage and prevent leakage, since they are the relays immediately concerned in connecting the conductors to be tested, first to the charging source of current and then to the galvanometer or other instrument used for measuring the charge retained by the conductors tested. The general plan of this system is to first connect the conductors to be tested, for a certain predetermined time interval to a source of charging current of constant voltage, such voltage being sufficient to charge such conductors sufficiently in a short interval. Next, a shunt circuit of adjustable resistance is closed across the terminals of the galvanometer and at the close of the charging interval the charging circuit is broken and the charged conductors are immediately connected to the terminals of the galvanometer. The result of this is that the charged conductors discharge while thus connected through both the shunt circuit and the galvanometer coils and a throw of the galvanometer will be produced which will be a measure of the quantity of electrification retained by such conductors, since prior to the tests in any case the constant of the galvanometer is determined experimentally in any well known manner not shown and the resistance of the shunt circuit is adjusted so that the throw for the conductors to be tested will be the most advantageous for the particular galvanometer used. Thus by comparing the deflections for any test with the constant of the galvanometer, the quantity of electrification of the conductors is measured, or in other words, the capacity of the conductors charged is proportional to such quantity of electrification; thus if the constant of the galvanometer is determined by using a standard condenser, by a simple comparison of the throw of the galvanometer for any test with the throw for the standard condenser, the capacity of the conductors tested may be determined very readily.

The relays 1, 2, 3, 4 and 5 are designed to be operated one from another, when one of such relays is actuated by closing its operating circuit and they effect the operation of the relays 6, 7 and 8, which in turn cause the charging and discharging of the conductors to be tested in the manner just above described. In the example shown in Fig. 1 a cable C is indicated having one of its conductors $w^1$ connected to wire 68, while the rest of such conductors $w$ are connected together and to wire 67 and also to the sheath $s$ of the cable, which sheath is grounded as indicated at $G^2$. The purpose of this connection is to test the capacity of the conductor $w^1$ against all of the other conductors $w$ of the cable. In the example shown, a galvanometer $g$ is used for measuring the capacity.

When the key K is moved to the left, a circuit is closed as follows: grounded terminal of battery B, wire 21, wire 45, key K, contact 46, wire 40, winding of relay 2, wire 41, wire 24, back to battery B. Thus relay 2 is energized and contacts 14 and 15 are closed, establishing the following circuit: grounded terminal of battery B, wire 21, wire 43, contact 20, wire 38, contact 14, wire 39, winding of relay 8, wire 70, back to battery B. Thus relay 8 is energized and contacts 55 and 56 are closed, by which the charging battery $B^1$ is connected through resistance $R^1$, to wires 67 and 68 and thus to the conductors $w$ and $w^1$ to be tested. This circuit is closed as follows: grounded terminal of battery $B^1$, wire 65, contact 55, charging lead 66, back contact 53, wire 67, conductors $w$, conductor $w^1$, wire 68, back contact 51, charging lead 63, contact 56, wire 69, resistance $R^1$, back to battery $B^1$. At the time of closing contact 15, relays 4 and 5 are energized as follows: grounded terminal of battery B, wire 21, wire 45, key K, contact 46, wire 37, contact 15, wire 28, contact 10, winding of relay 4, wire 30, wire 27, winding of relay 5, wire 24, back to battery B. Thus contacts 9 and 11 are closed and contact 10 is opened. The opening of contact 10 energizes relay 3 as follows: grounded terminal of battery B, wire 21, wire 45, key K, contact 46, wire 37, contact 15, wire 28, wire 33, winding of relay 3, wire 34, wire 29, winding of relay 4, wire 30, wire 27, winding of relay 5, wire 24, back to battery B. The closing of contact 11 establishes a second energizing path for relay 8 as follows: grounded terminal of battery B, wire 21, wire 25, contact 11, wire 26, wire 39, winding of relay 8, wire 70, wire 24, back to battery B. The closing of contact 9 operates relay 6 as follows: grounded terminal of battery B, wire 21, contact 9, wire 22, wire 23, winding of relay 6, wire 61, wire 70, wire 24, back to battery B. Thus relay 6 is energized and connects the galvanometer $g$ with the adjustable resistance R preparatory to sending through such resistance and galvanometer the charge from conductors $w$ and $w^1$. The connection is as follows: galvanometer $g$, wire 59, contact 50, wire 58, resistance R, wire 57, back to galvanometer $g$. The operation of relay 3 closes contacts 12 and 13 which close circuits as follows: grounded terminal of battery B, wire 21, contact 9, wire 22, contact 12, winding of relay 3, wire 34, wire 29, winding of relay 4, wire 30, wire 27, winding of relay 5, wire 24, back to battery B. Thus a locking circuit is established for relays 3, 4 and 5 which is maintained until one of such relays is deënergized. The closing of contact 13 energizes relay 1 as follows: grounded terminal of battery B, wire 21, wire 31, contact 13, wire 32, winding of relay 1, wire 44, wire 24, back to battery B. The operation of relay 1 closes contacts 17 and 19 and opens contact 20 with the following results: The closing of contact 19 operates relay 7 as follows: grounded terminal of battery B, wire 21, wire 43, contact 19, wire 42, winding of relay 7, wire 64, wire 61, wire 70, wire 24, back to battery B. Thus relay 7 is operated, which by breaking contacts 51 and 53 and closing contacts 52 and 54, interrupts the connection of wires 68 and 67 through such contacts 51 and 53 with charging battery $B^1$ and immediately connects such wires 68 and 67 through contacts 52 and 54 with wires 60 and 62 respectively, and thereby to the galvanometer circuit above traced and in such a way that the charge flowing through such wires 60 and 62 will flow through the galvanometer and resistance connected therewith in parallel. The opening of contact 20 opens one of the energizing circuits of relay 8 above traced. Such relay is not, however, deënergized on account of the second energizing circuit also above traced through contact 11 of relay 4. The closing of contact 17 short circuits the energizing winding of relay 4 as follows: winding of relay 4, wire 30, wire 27, contact 17, wire 29, back to the winding of relay 4. This causes the deënergization of such relay and closes contact 10 and opens contact 11. The opening of contact 11 opens the second energizing circuit above described for relay 8 and thereby permits the deënergization of such relay and the opening of contacts 55 and 56 without, however, producing any operative change in the circuits, since the circuit controlled by such contacts is at this time opened by the energized condition of relay 7 opening contacts 51 and 53. The closing of contact 10 short circuits the energizing of relay 3 as follows: winding of relay 3, wire 34, wire 29, contact 10, wire 28, wire 33, back to winding of relay 3. This causes the deënergization of relay 3 and the opening of contacts 12 and 13. The opening of contact 12 opens the locking circuit above described for relays 3, 4 and 5 and thus causes the deënergization of relay 5 and the opening of contact 9. The opening of contact 13 opens the energizing circuit above described for relay 1 and therefore causes the deënergization of such relay and the opening of contacts 17 and 19 and the closing of contact 20. The opening of contact 9 opens the energizing circuit above described for relay 6 and thereby deënergizes such relay. The opening contact 19 opens the energizing circuit of relay 7 above described and thereby opens contacts 52 and 54 and closes contacts 51 and 53, thereby terminating the discharge interval and the closing of contact 20 does not again operate relay 8 since contact 46 has been opened by permitting the key K to resume its normal position, for which position no contact is made by such key. The opening of contact 17 removes the short circuit from relay 4 above described, thereby restoring the circuit of such relay to its normal condition ready for the next operation. It is occasionally desirable to prolong the interval of discharge, which is done by holding the key K to the left thereby closing contact 46 which, as long as it is held in this position, maintains the energizing circuits above described for relays 2 and 5. A locking circuit is provided for relay 1 by means of contact 18 on such relay and contact 16 on relay 2 by which such relay 1 when operated as above described, closes contact 18 and if relay 2 is maintained operated and contact 16 is therefore closed, the locking circuit is closed as follows: grounded terminal of battery B, wire 21, wire 36, contact 16, wire 35, contact 18, wire 32, winding of relay 1, wire 44, wire 24, back to battery B. Thus as long as the key K is held to the left and contact 46 is closed, relay 1 is energized, thereby maintaining relay 7 energized, for which condition wires 68 and 67 and therefore conductors $w^1$ and $w$ connected thereto are maintained in connection with the galvanometer $g$ and resistance R. It will be noticed from the circuits above described that when the relay 7 is not energized, if the relay 6 is energized, the resistance R and galvanometer $g$ are connected in series and the motion of the galvanometer coil is dampened or retarded, which condition may be secured when desired by moving key K to the right thereby closing contact 47 and energizing relay 6 as follows: grounded terminal of battery B, wire 21, wire 45, key K, contact 47, wire 48, wire 23, winding of relay 6, wire 61, wire 70, wire 24, back to battery B. Thus a means is provided for dampening the motion of the galvanometer coil as desired. It is to be noted that the interval of charge is determined by the length of time required for the successive energization of relays 4, 3 and 1, since the energizing circuit of relay 4 is closed at the same instant that the energizing circuit of relay 8 is closed, and that the charging condition is maintained until relay 7 operates, which is the direct result of the operation of relay 1, which, however, is operated by relay 3 which in turn is operated by relay 4. It will also be noted that the interval of discharge is determined by the length of time required for the deënergization of relays 4, 3 and 1 and that this is a much longer interval than that required for their energization, since relay 4 is deënergized by having an external path of low resistance closed between its terminals which relay in turn closes an external path of low resistance between the terminals of the winding of relay 3. By this device, therefore, it is possible to secure just the condition desired, that is, to establish a longer interval of discharge than of charge by the use of the same mechanism as used in determining the charging interval, and by this device it is also possible to reduce the amount of mechanism involved to a minimum for any required discharge interval.

Figure 5:
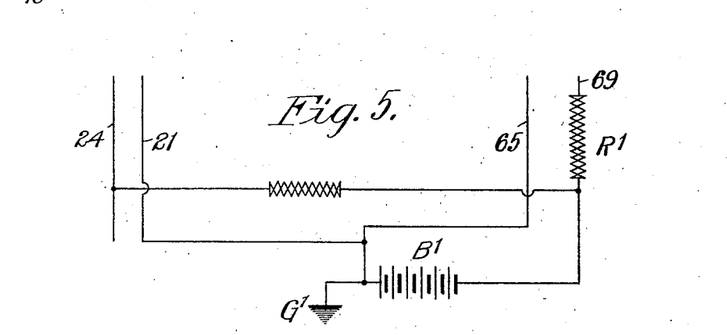
Fig. 5 shows a diagrammatic circuit arrangement by which a single battery may be substituted for the two batteries shown in Fig. 1.

It is generally found advisable to use a separate source of energy for charging the conductors to be tested from that used for operating the several relays, but in special cases where it may be desirable to use one source of energy for operating the apparatus as well as charging the conductors to be tested, the battery B may be omitted as shown in Fig. 5 and the connections and resistance indicated may be used, whereby battery B¹ may be used to operate the various relays as well as to charge the conductors to be tested.

In Fig. 5 the conductors 21, 24, 65 and 69 are supposed to have the same connections extending from them as indicated in Fig. 1, and hence these connections and the apparatus controlled thereby are not shown in Fig. 5 for the sake of clearness.

Figure 2:
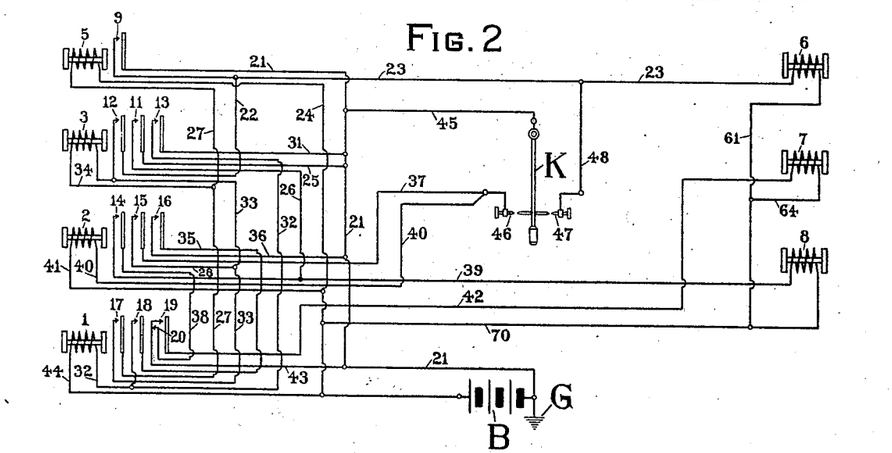
Figs. 2, 3 and 4 show modified arrangements of apparatus and circuits by which different charging intervals are secured, as will be explained.

In Fig. 2 a modification of our invention is shown in which the charging and discharging intervals are shortened by omitting one of the operating relays. In this figure the circuits controlled by relays 6, 7 and 8 are not shown since they are identical with those shown in Fig. 1. In this modification, operating relays 1, 2, 3 and 5 are employed similarly to the corresponding relays used in the modification shown in Fig. 1, the operation of the relays shown in Fig. 2 being as follows: When the key K is moved to the left closing contact 46 an energizing circuit is closed through the winding of relay 2 as for Fig. 1. This closes contacts 14, 15 and 16 and contact 15 in turn closes a circuit as follows: grounded terminal of battery B, wire 21, wire 45, key K, contact 46, wire 37, contact 15, wire 33, winding of relay 3, wire 34, wire 27, winding of relay 5, wire 24, back to battery B. Thus relays 3 and 5 are energized closing contacts 9, 11, 12 and 13. The closing of contact 14 operates relay 8 as described for Fig. 1. The closing of contact 9 by the operation of relay 5 energizes relay 6 as described for Fig. 1; the closing of contact 12 closes a locking circuit for relays 3 and 5 as described for Fig. 1 for relays 3, 4, and 5; the closing of contact 13 closes the energizing circuit of relay 1 as described for Fig. 1 and thereby closes contacts 17, 18 and 19 and opens contact 20. The closing of contact 11 serves the same purpose as described for Fig. 1 for contact 11 on relay 4. Contacts 16, 18, 19 and 20 perform the same function as described for Fig. 1 while contact 17 short circuits the winding of relay 3 as follows: winding of relay 3, wire 34, wire 27, contact 17, wire 33, back to winding of relay 3. Thus it will be seen that the closing of contact 46 operates relay 2, which in turn simultaneously operates relays 3, 5 and 8; also the operation of relays 3 and 5 operates relays 1 and 6 as already described for Fig. 1, and further that the operation of relay 1 operates in the manner already described to end the charging interval and begin the discharging interval by operating relay 7. From the circuits just traced it is also apparent that the operation of relay 1 deënergizes relay 3, thus deënergizing relays 1, 5 and 8. The deënergization of relays 1 and 5 deënergizes the relays 6 and 7 as already described. From this it appears that the charging interval extends from the operation of relay 2 until the operation of relay 1; that is, it is measured by the time required for the successive operation of relays 3 and 1 and that the interval of discharge is measured by the time required for relays 3 and 1 to be deënergized and that such interval is relatively longer than the charging interval due to the manner in which relay 3 is deënergized; that is, by short circuiting its terminals instead of open circuiting its energizing circuit.

Figure 3:
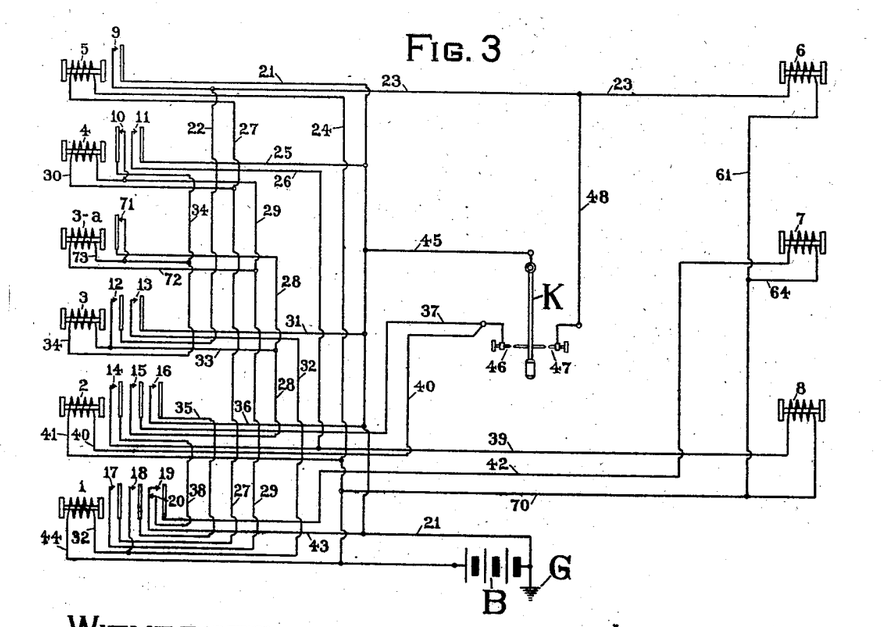

In Fig. 3 a modification of our invention is indicated similar to the modification shown in Fig. 2, but with this difference, that instead of showing an arrangement for securing a shorter interval of charge and discharge, Fig. 3 shows an arrangement for securing longer intervals of charge and discharge than indicated in Fig. 1. In this modification, operating relays 1, 2, 3, 3ᵃ, 4 and 5 are employed, the circuits being similar to those already described for Figs.

1 and 2. The only difference is, the winding of relay 3ª is inserted in the circuit between the windings of relays 3 and 4 shown in Fig. 1 and is provided with a normally closed contact 71, which serves to normally short circuit the energizing winding of relay 3, the contact 10 of relay 4 normally serving in this modification to short circuit the energizing winding of relay 3ª. Thus it will be seen in this modification, when key K. is moved to contact 46, the relay 2 is operated as already described, thereby in turn simultaneously operating relays 4, 5 and 8. The operation of relays 4 and 5 operates relays 3ª and 6 and the operation of relay 3ª operates relay 3 which in turn operates relay 1 by which, as already described, relay 7 is operated and relay 4 is deënergized. The deënergization of relay 4 causes the deënergization of relay 3ª by closing an external path of low resistance between the terminals of such relay 3ª through contact 10, and the deënergization of relay 3ª closes an external path of low resistance between the terminals of the energizing winding of relay 3 through contact 71. The deënergization of relay 3 produces the same results as already described for Fig. 1. Thus it will be seen that the charging interval in this modification is measured by the time required for the successive energization of relays 4, 3ª, 3 and 1, and that the discharge interval is measured by the time required for the deënergization of relays 4, 3ª, 3 and 1, and also that such interval of discharge is relatively longer than the charging interval, due to the manner in which relays 3, 3ª and 4 are deënergized.

Figure 4:
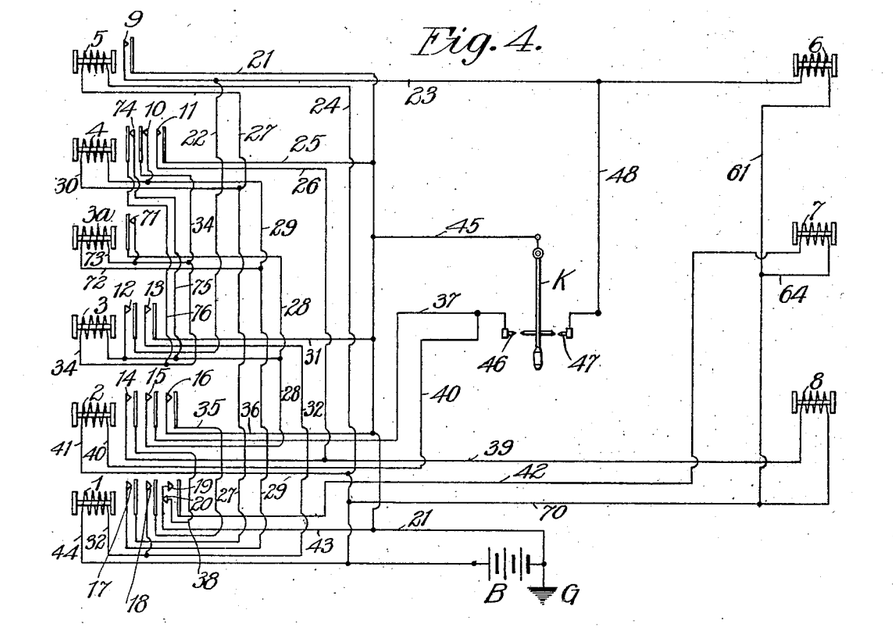

Thus it will be seen that a means is provided in our system for varying the charging and discharging intervals as desired; obviously by employing a larger series of operating relays, the charging and discharging intervals can be lengthened, and it is equally obvious that the relation between the charging and discharging intervals may be varied by the manner in which the deënergization of the relays of such series is effected; that is, if it is desired to have a comparatively long charging interval without increasing correspondingly the discharging interval, it is only necessary to omit one or more steps in the deënergization of the relays of such series; that is, for instance as shown in Fig. 4, the deënergization of relay 4 may readily be made to deënergize relay 3 directly as indicated in Fig. 1 by closing an external path of low resistance between the terminals of the energizing winding of relay 3, although at the same time the relay 3ª shown in Fig. 3 may be a necessary factor in determining the charging interval; that is, the energization of relay 3 may be made to depend upon the energization of relay 3ª in this particular case as indicated in Fig. 3.

In the arrangement shown in Fig. 4 it is to be observed that the sequence of energization of the several relays 2, 4, 5, 3ª, 3 and 1 is precisely the same as that already described in connection with Fig. 3, while the result of the operation of relay 1 and the subsequent deënergization of relay 4 by the short-circuiting of its winding through contact 17, closed by the energization of relay 1, not only short circuits the energizing winding of the relay 3ª, but also by means of contact 74, closed by the deënergization of relay 4, the energizing winding of relay 3 is short-circuited through the conductors 75 and 76. That is, the deënergization of relay 4 immediately effects the deënergization of relay 3, thereby eliminating the operation of the relay 3ª during the sequence of deënergization of the several relays.

From the operation of the apparatus shown in Figs. 2, 3 and 4, it is quite apparent that with a given set of testing apparatus constructed in accordance with our invention, in which there is a series of relays employed to secure a long interval of charge and discharging of the conductors, any desired charging and discharging intervals less than the maximum may be secured by properly connecting the relays, and furthermore that by connections similar to those shown in Fig. 4 the length of the charging interval may be changed relatively to the length of the discharging interval.

We believe that the automatic testing or measuring of the capacity of associated electrical conductors has not been accomplished prior to this invention, that is, that no mechanism has been employed by means of which the single closure of an electrical key operates suitable mechanism to charge and discharge electrical conductors for predetermined and adjustable intervals in such a manner as to measure the capacity of such conductors, and we therefore claim broadly the fundamental features of such a system.

We would have it understood that many other modifications may be used in following out our invention without departing from the spirit thereof, and we do not limit ourselves, therefore, to the exact embodiments of such invention indicated in the accompanying drawings and specification.

What we claim is:

1. In a system for measuring electric capacity, an electric conductor, a measuring instrument, a source of operating current, a source of charging current, a manually operated switch, mechanism initially operated by current from said operating source through contacts of said switch adapted to complete a charging circuit between said charging source and said conductor, adapted then to interrupt said connection and to connect said conductor to the measuring instrument, the time of charge being independent of the length of time the manually operated switch is maintained operated, substantially as described.

2. In a system for measuring electric capacity, an electric conductor, a measuring instrument, a source of charging current, a manually operated switch, mechanism initially operated by the actuation of said switch to complete a circuit between said source and said conductor and to thereafter interrupt said circuit and complete a circuit between said conductor and said measuring instrument, the time of charge of said conductor being predetermined and being independent of the manner of operation of said manually operated switch, substantially as described.

3. A system for measuring electric capacity, comprising a measuring instrument, an electric conductor, a source of charging current, and instrumentalities for connecting said source with said conductor, disconnecting it therefrom and connecting said conductor with said measuring instrument, the time during which said source is connected with said conductor being the same for each successive operation and being independent of the manner in which the actuation of said instrumentalities is initiated, substantially as described.

4. In a system for measuring the capacity of associated electrical conductors, electromagnetic mechanism a source of electric energy adapted to operate such mechanism, a key for operating such mechanism, a source of electric energy adapted to charge the conductors to be tested, an instrument adapted to measure electrical capacity, the actuation of such mechanism by such key being adapted to automatically connect such conductors to such charging source of electric energy for a predetermined interval and then to interrupt such charging circuit and connect such conductors thus charged to such measuring instrument and restore such mechanism to its normal condition and such charging interval being independent of the interval such key is held in its operative position.

5. In a system for measuring the capacity of associated electrical conductors, a plurality of electro-magnetic devices a source of electric energy adapted to operate such devices, a key for operating a first of such devices, a source of electric energy adapted to charge the conductors to be tested, an instrument adapted to measure electrical capacity, the operation of such first device being adapted to successively operate others of such devices and the operation of such devices brings about the connection of the conductors to be tested to such charging source of electric energy for a predetermined interval, the disconnection of such conductors from such source of energy and then the connection of such charged conductors to such measuring instrument.

6. In a system for measuring the capacity of associated electrical conductors, a plurality of electro-magnetic devices a source of electric energy adapted to operate such devices, a key for operating a first of such devices, a source of electric energy adapted to charge the conductors to be tested, an instrument adapted to measure electrical capacity, the operation of such first device being adapted to successively operate others of such devices and the operation of such devices being adapted to connect the conductors to be tested to such charging source of electric energy for a predetermined interval, disconnect such conductors from such source of energy, connect such charged conductors to such measuring instrument and then restore the devices thus operated to their normal condition.

7. In a system for measuring the capacity of associated electrical conductors, a plurality of electro-magnetic devices a source of electric energy adapted to operate such devices, a key for operating a first of such devices, a source of electric energy adapted to charge the conductors to be tested, an instrument adapted to measure electrical capacity, means whereby the operation of such first device successively operates others of such devices, means whereby the operation of such devices connects the conductors to be tested to such charging source of electric energy for a predetermined interval, disconnects such conductors from such source of energy, connects such charged conductors to such measuring instrument and then restores the devices thus operated to their normal condition.

8. In a system for measuring the capacity of associated electrical conductors, a plurality of electro-magnetic devices a source of electric energy adapted to operate such devices, a key for operating a first of such devices, a source of electric energy adapted to charge the conductors to be tested, an instrument adapted to measure electrical capacity, the operation of such first device being adapted to successively operate others of such devices and the operation of such devices being adapted to connect the conductors to be tested to such charging source of electric energy for a predetermined interval, disconnect such conductors from such source of energy and then connect such charged conductors to such measuring instrument, such charging interval being independent of the interval such key is held in its operative position.

9. In a system for measuring the capacity of associated electrical conductors, a plurality of electro-magnetic devices a source of electric energy adapted to operate such devices, a key for operating a first of such devices, a source of electric energy adapted to charge the conductors to be tested, an instrument adapted to measure electrical capacity, the operation of such first device being adapted to successively operate others of such devices and the operation of such devices being adapted to connect the conductors to be tested to such charging source of electric energy for a predetermined interval, disconnect such conductors from such source of energy, connect such charged conductors to such measuring instrument and then restore the devices thus operated to their normal condition, such charging interval being independent of the interval such key is held in its operative position.

10. In a system for measuring the capacity of associated electrical conductors, a series of electro-magnetic devices a source of electric energy adapted to operate such devices, a key for operating a first device of such series, a source of electric energy adapted to charge the conductors to be tested, an instrument adapted to measure electrical capacity, the operation of such first device being adapted to energize and deënergize the remaining devices of such series such operation serving successively to connect the conductors to be tested to such charging source of electric energy for a predetermined interval, disconnect such conductors from such source of energy and then to connect such conductors to such measuring instrument, such charging and discharging intervals being determined respectively by the intervals required for successively energizing and successively deënergizing such devices.

11. In a system for measuring the capacity of associated electrical conductors, a series of electro-magnetic devices a source of electric energy adapted to operate such devices, a key for operating a first device of such series, a source of electric energy adapted to charge the conductors to be tested, an instrument adapted to measure electrical capacity, the operation of such first device being adapted to energize and deënergize the remaining devices of such series such operation serving to connect the conductors to be tested to such charging source of electric energy for a predetermined interval, disconnect such conductors from such source of energy and then to connect such conductors to such measuring instrument, such charging and discharging intervals being determined respectively by the intervals required for successively energizing and successively deënergizing such devices, such deënergization resulting from closing an external electrical path of low resistance between the terminals of an energizing winding of one of such devices whereby the discharging interval is relatively greater than the charging interval.

12. In a system for measuring the capacity of associated electrical conductors, a series of electro-magnetic devices a source of electric energy adapted to operate such devices, a key for operating a first device of such series, a source of electric energy adapted to charge the conductors to be tested, an instrument adapted to measure electrical capacity, the operation of such first device being adapted to energize and deënergize the remaining devices of such series such operation serving to connect the conductors to be tested to such charging source of electric energy for a predetermined interval, disconnect such conductors from such source of energy and then to connect such conductors to such measuring instrument, such charging and discharging intervals being determined respectively by the intervals required for successively energizing and successively deënergizing such devices, such deënergization resulting from closing external electrical paths of low resistance between the terminals of energizing windings of such devices whereby the discharging interval is relatively greater than the charging interval.

13. In a system for measuring the capacity of associated electrical conductors, a series of relays a source of electric energy adapted to operate such relays, a key for operating a first relay of such series, a source of electric energy adapted to charge the conductors to be tested, an instrument adapted to measure electrical capacity, a shunt circuit of adjustable resistance adapted to be closed between the terminals of such instrument, means operated by such first relay for connecting the conductors to be tested to such charging source and for energizing a second of such relays, means operated by such second relay for closing such shunt circuit, means for successively energizing the remaining relays of such series each from the one preceding it, means for maintaining such relays energized until the operation of the last of such relays, means operated by the last of such relays for disconnecting such conductors from such charging source and for connecting such conductors to such instrument and for at the same time deënergizing one of such series of relays, means actuated by the deënergization of such last mentioned relay for deënergizing another of the relays of such series, means for similarly deënergizing the remaining relays of such series, means actuated by the deënergization of the last relays of such series for disconnecting such conductors from such instrument and for immediately thereafter opening such shunt circuit whereby the apparatus is restored to its normal condition.

14. In a system for measuring the capacity of associated electrical conductors, a series of relays a source of electric energy adapted to operate such relays, a key for operating a first relay of such series, a source of electric energy adapted to charge the conductors to be tested, an instrument adapted to measure electrical capacity, a shunt circuit of adjustable resistance adapted to be closed between the terminals of such instrument, means operated by such first relay for connecting the conductors to be tested to such charging source and for energizing a second of such relays, means operated by such second relay for closing such shunt circuit, means for successively energizing the remaining relays of such series each from the one preceding it, means for maintaining such relays energized until the operation of the last of such relays, means operated by the last of such relays for disconnecting such conductors from such charging source and for connecting such conductors to such instrument and for at the same time deënergizing one of such series of relays, means actuated by the deënergization of such last mentioned relay for deënergizing another of the relays of such series, means for similarly deënergizing the remaining relays of such series, means actuated by the deënergization of the last relays of such series for disconnecting such conductors from such instrument and for immediately thereafter opening such shunt circuit whereby the apparatus is restored to its normal condition, such deënergization of such relays resulting from closing an external path of low resistance between the terminals of one of such relays whereby the discharging interval through such measuring instrument is relatively greater than the charging interval of such conductors.

15. In a system for measuring the capacity of associated electrical conductors, a series of relays a source of electric energy adapted to operate such relays, a key for operating a first relay of such series, a source of electric energy adapted to charge the conductors to be tested, an instrument adapted to measure electrical capacity, a shunt circuit of adjustable resistance adapted to be closed between the terminals of such instrument, means operated by such first relay for connecting the conductors to be tested to such charging source and for energizing a second of such relays, means operated by such second relay for closing such shunt circuit, means for successively energizing the remaining relays of such series each from the one preceding it, means for maintaining such relays energized until the operation of the last of such relays, means operated by the last of such relays for disconnecting such conductors from such charging source and for connecting such conductors to such instrument and for at the same time deënergizing one of such series of relays, means actuated by the deënergization of such last mentioned relay for deënergizing another of the relays of such series, means for similarly deënergizing the remaining relays of such series, means actuated by the deënergization of the last relays of such series for disconnecting such conductors from such instrument and for immediately thereafter opening such shunt circuit whereby the apparatus is restored to its normal condition, such deënergization of such relays resulting from closing external paths of low resistance between the terminals of such relays whereby the discharging interval through such measuring instrument is relatively greater than the charging interval of such conductors.

16. In a system for measuring the capacity of associated electrical conductors, a series of relays a source of electric energy adapted to operate such relays, a key for operating a first relay of such series, a source of electric energy adapted to charge the conductors to be tested, an instrument adapted to measure electrical capacity, a shunt circuit of adjustable resistance adapted to be closed between the terminals of such instrument, charging leads normally disconnected from such charging source and normally connected to the conductors to be tested and adapted to be connected to such charging source and disconnected from such conductors, means operated by such first relay for connecting such charging leads to such charging source and for energizing a second of such relays, means operated by such second relay for closing such shunt circuit, means for successively energizing the remaining relays of such series each from the one preceding it, means for maintaining such relays energized until the operation of the last of such relays, means operated by the last of such relays for disconnecting such conductors from such charging leads and for connecting such conductors to such instrument and for at the same time deënergizing one of such series of relays, means actuated by the deënergization of such last mentioned relay for disconnecting such charging leads from such charging source and for deënergizing another of the relays of such series, means for similarly deënergizing the remaining relays of such series, means actuated by the deënergization of the last relays of such series for disconnecting such conductors from such instrument and for immediately thereafter opening such shunt circuit whereby the apparatus is restored to its normal condition.

17. In a system for measuring the capacity of associated electrical conductors, a series of relays a source of electric energy adapted to operate such relays, a key for operating a first relay of such series, a source of electric energy adapted to charge the conductors to be tested, an instrument adapted to measure electrical capacity, a shunt circuit of adjustable resistance adapted to be closed between the terminals of such instrument, charging leads normally disconnected from such charging source and normally connected to the conductors to be tested and adapted to be connected to such charging source and disconnected from such conductors, means operated by such first relay for connecting such charging leads to such charging source and for energizing a second of such relays, means operated by such second relay for closing such shunt circuit, means for successively energizing the remaining relays of such series each from the one preceding it, means for maintaining such relays energized until the operation of the last of such relays, means operated by the last of such relays for disconnecting such conductors from such charging leads and for connecting such conductors to such instrument and for at the same time deenergizing one of such series of relays, means actuated by the deënergization of such last mentioned relay for disconnecting such charging leads from such charging source and for deënergizing another of the relays of such series, means for similarly deënergizing the remaining relays of such series, means actuated by the deënergization of the last relays of such series for disconnecting such conductors from such instrument and for immediately thereafter opening such shunt circuit whereby the apparatus is restored to its normal condition, such deënergization of such relays resulting from closing an external path of low resistance between the terminals of one of such relays whereby the discharging interval through such measuring instrument is relatively greater than the charging interval of such conductors.

18. In a system for measuring the capacity of associated electrical conductors, a series of relays a source of electric energy adapted to operate such relays, a key for operating a first relay of such series, a source of electric energy adapted to charge the conductors to be tested, an instrument adapted to measure electrical capacity, a shunt circuit of adjustable resistance adapted to be closed between the terminals of such instrument, charging leads normally disconnected from such charging source and normally connected to the conductors to be tested and adapted to be connected to such charging source and disconnected from such conductors, means operated by such first relay for connecting such charging leads to such charging source and for energizing a second of such relays, means operated by such second relay for closing such shunt circuit, means for successively energizing the remaining relays of such series each from the one preceding it, means for maintaining such relays energized until the operation of the last of such relays, means operated by the last of such relays for disconnecting such conductors from such charging leads and for connecting such conductors to such instrument and for at the same time deenergizing one of such series of relays, means actuated by the deënergization of such last mentioned relay for disconnecting such charging leads from such charging source and for deënergizing another of the relays of such series, means for similarly deënergizing the remaining relays of such series, means actuated by the deënergization of the last relays of such series for disconnecting such conductors from such instrument and for immediately thereafter opening such shunt circuit whereby the apparatus is restored to its normal condition, such deënergization of such relays resulting from closing external paths of low resistance between the terminals of such relays whereby the discharging interval through such measuring instrument is relatively greater than the charging interval of such conductors.

19. In a system for measuring the capacity of associated electrical conductors, a capacity measuring instrument, a source of electric energy, a manually operated key, means controlled by the initial operation of said key for automatically connecting the conductors to said source for an unvarying period of time and means also controlled by the initial operation of said key for disconnecting said conductors from said source and connecting them to the capacity measuring instrument.

20. In a system for measuring the capacity of associated electrical conductors, a source of electricity, an instrument for measuring capacity, means adapted to be manually operated and means for automatically connecting the conductors to said source for an unvarying period of time and means for disconnecting them therefrom and connecting them to said instrument, the operation of the latter two means depending upon the initial operation of the manually operated means.

21. In a system for measuring the capacity of associated electrical conductors, a source of electric energy, an instrument for measuring capacity, a starting key, means for automatically connecting the conductors to said source for a predetermined, unvarying interval, and means started by the initial operation of said starting key for disconnecting the conductors from said source and then connecting them to said instrument.

22. In a system for measuring the capacity of associated electrical conductors, a source of electric energy, an instrument for measuring capacity, a controlling switch, means controlled thereby for automatically connecting the conductors to the said source for a predetermined, unvarying interval, and means controlled by the same movement of said controlling switch for disconnecting the conductors from said source and then connecting them to said instrument for a predetermined interval.

OSCAR M. LEICH.
CHARLES E. HAGUE.

Witnesses:
ARTHUR R. KAHL,
MONTGOMERY S. VAN VLEET.